United States Patent
Bhattacharya et al.

(10) Patent No.: US 12,056,633 B2
(45) Date of Patent: Aug. 6, 2024

(54) SYSTEM AND METHOD FOR TRIP CLASSIFICATION

(71) Applicant: Zendrive, Inc., San Francisco, CA (US)

(72) Inventors: Sambuddha Bhattacharya, San Francisco, CA (US); Amol Bambode, San Francisco, CA (US); Laxman Jangley, San Francisco, CA (US); Darshan Shirodkar, San Francisco, CA (US); Rajesh Bhat, San Francisco, CA (US); Abhishek, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 0 days.

(21) Appl. No.: 18/074,859

(22) Filed: Dec. 5, 2022

(65) Prior Publication Data

US 2023/0177414 A1   Jun. 8, 2023

Related U.S. Application Data

(60) Provisional application No. 63/285,650, filed on Dec. 3, 2021.

(51) Int. Cl.
 *G06Q 10/02* (2012.01)
 *G06N 5/01* (2023.01)

(52) U.S. Cl.
 CPC ............ *G06Q 10/025* (2013.01); *G06N 5/01* (2023.01)

(58) Field of Classification Search
 None
 See application file for complete search history.

(56) References Cited

U.S. PATENT DOCUMENTS

| | | | |
|---|---|---|---|
| 5,673,039 | A | 9/1997 | Pietzsch et al. |
| 5,864,305 | A | 1/1999 | Rosenquist |
| 6,049,778 | A | 4/2000 | Walker et al. |
| 6,055,477 | A | 4/2000 | McBurney et al. |

(Continued)

FOREIGN PATENT DOCUMENTS

| CN | 104680356 A | * | 6/2015 |
|---|---|---|---|
| CN | 108269406 A | | 7/2018 |

(Continued)

OTHER PUBLICATIONS

"Xu Youjuan, Middle and small-sized enterprise cooperative service platform of novel cloud architecture of novel technology, Jun. 3, 2015" NPL ard Original document are attached. (Year: 2015) NPL atttached.*

(Continued)

*Primary Examiner* — James M McPherson
*Assistant Examiner* — Bakari Underwood
(74) *Attorney, Agent, or Firm* — Jeffrey Schox

(57) ABSTRACT

The method can include optionally training a transportation modality classification model; determining a transportation modality of a trip; and optionally triggering an action based on the transportation modality. However, the method can additionally or alternatively include any other suitable elements. The method functions to facilitate a classification of a transportation modality for trips based on location data (e.g., collected at a mobile device). Additionally or alternatively, the method can function to facilitate content provisions based on a trip classification.

18 Claims, 10 Drawing Sheets

(56) References Cited

U.S. PATENT DOCUMENTS

| | | | |
|---|---|---|---|
| 6,064,318 | A | 5/2000 | Kirchner et al. |
| 6,178,374 | B1 | 1/2001 | Moehlenkamp et al. |
| 6,240,364 | B1 | 5/2001 | Kerner et al. |
| 6,826,477 | B2 | 11/2004 | Ladetto et al. |
| 6,941,222 | B2 | 9/2005 | Yano et al. |
| 7,065,449 | B2 | 6/2006 | Brewster et al. |
| 7,532,196 | B2 | 5/2009 | Hinckley |
| 7,668,931 | B2 | 2/2010 | Parupudi et al. |
| 7,801,675 | B2 | 9/2010 | Currie et al. |
| 7,881,868 | B2 | 2/2011 | Greene et al. |
| 8,054,168 | B2 | 11/2011 | Mccormick et al. |
| 8,264,375 | B2 | 9/2012 | Devries |
| 8,290,480 | B2 | 10/2012 | Abramson et al. |
| 8,326,257 | B2 | 12/2012 | Shiu et al. |
| 8,352,189 | B2 | 1/2013 | Scott et al. |
| 8,369,876 | B2 | 2/2013 | Bachmann et al. |
| 8,395,542 | B2 | 3/2013 | Scherzinger et al. |
| 8,489,330 | B2 | 7/2013 | Ellanti et al. |
| 8,498,610 | B2 | 7/2013 | Staehlin |
| 8,504,035 | B2 | 8/2013 | Shin et al. |
| 8,521,193 | B2 | 8/2013 | Paek et al. |
| 8,577,703 | B2 | 11/2013 | Mcclellan et al. |
| 8,634,822 | B2 | 1/2014 | Silver et al. |
| 8,731,530 | B1 | 5/2014 | Breed et al. |
| 8,738,523 | B1 | 5/2014 | Sanchez et al. |
| 8,754,766 | B2 | 6/2014 | Oesterling et al. |
| 8,912,103 | B2 | 12/2014 | Heo et al. |
| 8,971,927 | B2 | 3/2015 | Zhou et al. |
| 8,972,103 | B2 | 3/2015 | Elwart et al. |
| 8,996,234 | B1 | 3/2015 | Tamari et al. |
| 9,064,412 | B2 | 6/2015 | Baur |
| 9,121,940 | B2 | 9/2015 | Psiaki et al. |
| 9,141,974 | B2 | 9/2015 | Jones et al. |
| 9,185,526 | B2 | 11/2015 | Guba et al. |
| 9,188,451 | B2 | 11/2015 | Magnusson et al. |
| 9,221,428 | B2 | 12/2015 | Kote et al. |
| 9,222,798 | B2 | 12/2015 | Curtis et al. |
| 9,224,293 | B2 | 12/2015 | Taylor |
| 9,250,090 | B2 | 2/2016 | Hille et al. |
| 9,311,211 | B2 | 4/2016 | Chatterjee et al. |
| 9,311,271 | B2 | 4/2016 | Wright |
| 9,360,323 | B2 | 6/2016 | Grokop |
| 9,368,027 | B2 | 6/2016 | Jang et al. |
| 9,390,625 | B2 | 7/2016 | Green et al. |
| 9,414,221 | B1 | 8/2016 | Simon et al. |
| 9,423,318 | B2 | 8/2016 | Liu et al. |
| 9,449,495 | B1 | 9/2016 | Call et al. |
| 9,457,754 | B1 | 10/2016 | Christensen et al. |
| 9,467,515 | B1 | 10/2016 | Penilla et al. |
| 9,495,601 | B2 | 11/2016 | Hansen |
| 9,536,428 | B1 | 1/2017 | Wasserman |
| 9,558,520 | B2 | 1/2017 | Peak et al. |
| 9,564,047 | B2 | 2/2017 | Wu |
| 9,566,981 | B2 | 2/2017 | Rebhan et al. |
| 9,587,952 | B1 | 3/2017 | Slusar |
| 9,628,975 | B1 | 4/2017 | Watkins et al. |
| 9,632,507 | B1 | 4/2017 | Korn |
| 9,633,487 | B2 | 4/2017 | Wright |
| 9,645,970 | B2 | 5/2017 | Boesch et al. |
| 9,650,007 | B1 | 5/2017 | Snyder et al. |
| 9,674,370 | B2 | 6/2017 | Kim et al. |
| 9,689,698 | B2 | 6/2017 | Wesselius et al. |
| 9,716,978 | B2 | 7/2017 | Sankaran |
| 9,731,713 | B2 | 8/2017 | Horii |
| 9,773,281 | B1 | 9/2017 | Hanson |
| 9,794,729 | B2 | 10/2017 | Meyers et al. |
| 9,800,716 | B2 | 10/2017 | Abramson et al. |
| 9,801,027 | B2 | 10/2017 | Levy et al. |
| 9,805,601 | B1 | 10/2017 | Fields et al. |
| 9,818,239 | B2 | 11/2017 | Pal et al. |
| 9,842,120 | B1 | 12/2017 | Siris et al. |
| 9,852,475 | B1 | 12/2017 | Konrardy et al. |
| 9,854,396 | B2 | 12/2017 | Himmelreich et al. |
| 9,868,394 | B1 | 1/2018 | Fields et al. |
| 9,870,649 | B1 | 1/2018 | Fields et al. |
| 9,888,392 | B1 | 2/2018 | Snyder et al. |
| 9,900,747 | B1 | 2/2018 | Park |
| 9,932,033 | B2 | 4/2018 | Slusar et al. |
| 9,994,218 | B2 | 6/2018 | Pal et al. |
| 10,137,889 | B2 | 11/2018 | Pal et al. |
| 10,157,423 | B1 | 12/2018 | Fields et al. |
| 10,176,524 | B1 | 1/2019 | Brandmaier et al. |
| 10,278,039 | B1 | 4/2019 | Matus et al. |
| 10,304,329 | B2 | 5/2019 | Matus et al. |
| 10,324,463 | B1 | 6/2019 | Konrardy et al. |
| 10,386,192 | B1 | 8/2019 | Konrardy et al. |
| 10,510,123 | B1 | 12/2019 | Konrardy et al. |
| 10,533,870 | B1 | 1/2020 | Slusar |
| 10,559,196 | B2 | 2/2020 | Matus et al. |
| 10,572,386 | B1 | 2/2020 | Gokhale et al. |
| 10,848,913 | B2 | 11/2020 | Pal et al. |
| 10,872,525 | B2 | 12/2020 | Xu et al. |
| 2002/0161517 | A1 | 10/2002 | Yano et al. |
| 2002/0161518 | A1 | 10/2002 | Petzold et al. |
| 2003/0018430 | A1 | 1/2003 | Ladetto et al. |
| 2004/0046335 | A1 | 3/2004 | Knox et al. |
| 2004/0082311 | A1 | 4/2004 | Shiu et al. |
| 2005/0080555 | A1 | 4/2005 | Parupudi et al. |
| 2005/0093868 | A1 | 5/2005 | Hinckley |
| 2005/0197773 | A1 | 9/2005 | Brewster et al. |
| 2005/0288856 | A1 | 12/2005 | Ohki et al. |
| 2006/0153198 | A1 | 7/2006 | Chadha |
| 2007/0005228 | A1 | 1/2007 | Sutardja |
| 2007/0208494 | A1 | 9/2007 | Chapman et al. |
| 2007/0208501 | A1 | 9/2007 | Downs et al. |
| 2008/0033776 | A1 | 2/2008 | Marchese |
| 2008/0103907 | A1 | 5/2008 | Maislos et al. |
| 2008/0243439 | A1 | 10/2008 | Runkle et al. |
| 2008/0312832 | A1 | 12/2008 | Greene et al. |
| 2009/0024419 | A1 | 1/2009 | McClellan et al. |
| 2010/0030582 | A1 | 2/2010 | Rippel et al. |
| 2010/0056175 | A1 | 3/2010 | Bachmann et al. |
| 2010/0100398 | A1 | 4/2010 | Auker et al. |
| 2010/0106406 | A1 | 4/2010 | Hille et al. |
| 2010/0131304 | A1 | 5/2010 | Collopy et al. |
| 2010/0198517 | A1 | 8/2010 | Scott et al. |
| 2010/0219944 | A1 | 9/2010 | Mc et al. |
| 2010/0273508 | A1 | 10/2010 | Parata et al. |
| 2010/0299021 | A1 | 11/2010 | Jalili |
| 2010/0332131 | A1 | 12/2010 | Horvitz et al. |
| 2011/0077028 | A1 | 3/2011 | Wilkes et al. |
| 2011/0124311 | A1 | 5/2011 | Staehlin |
| 2011/0161116 | A1 | 6/2011 | Peak et al. |
| 2011/0224898 | A1 | 9/2011 | Scofield et al. |
| 2011/0246156 | A1 | 10/2011 | Zecha et al. |
| 2011/0294520 | A1 | 12/2011 | Zhou et al. |
| 2012/0050095 | A1 | 3/2012 | Scherzinger et al. |
| 2012/0065871 | A1 | 3/2012 | Deshpande et al. |
| 2012/0066053 | A1 | 3/2012 | Agarwal |
| 2012/0089328 | A1 | 4/2012 | Ellanti et al. |
| 2012/0129545 | A1 | 5/2012 | Hodis et al. |
| 2012/0136529 | A1 | 5/2012 | Curtis et al. |
| 2012/0136567 | A1 | 5/2012 | Wang et al. |
| 2012/0149400 | A1 | 6/2012 | Paek et al. |
| 2012/0158820 | A1 | 6/2012 | Bai et al. |
| 2012/0197587 | A1 | 8/2012 | Luk et al. |
| 2012/0226421 | A1 | 9/2012 | Kote et al. |
| 2012/0245963 | A1 | 9/2012 | Peak et al. |
| 2013/0006469 | A1 | 1/2013 | Green et al. |
| 2013/0041521 | A1 | 2/2013 | Basir et al. |
| 2013/0052614 | A1 | 2/2013 | Mollicone et al. |
| 2013/0069802 | A1 | 3/2013 | Foghel et al. |
| 2013/0073202 | A1 | 3/2013 | Zheng et al. |
| 2013/0096731 | A1 | 4/2013 | Tamari et al. |
| 2013/0124074 | A1 | 5/2013 | Horvitz et al. |
| 2013/0130639 | A1 | 5/2013 | Desterling et al. |
| 2013/0204515 | A1 | 8/2013 | Emura |
| 2013/0211618 | A1 | 8/2013 | Iachini |
| 2013/0282264 | A1 | 10/2013 | Bastiaensen et al. |
| 2013/0302758 | A1 | 11/2013 | Wright |
| 2013/0316737 | A1 | 11/2013 | Guba et al. |
| 2013/0317860 | A1 | 11/2013 | Schumann |
| 2013/0325517 | A1 | 12/2013 | Berg |
| 2013/0332357 | A1 | 12/2013 | Green et al. |

(56) References Cited

U.S. PATENT DOCUMENTS

| | | |
|---|---|---|
| 2013/0344856 A1 | 12/2013 | Silver et al. |
| 2014/0038640 A1 | 2/2014 | Wesselius et al. |
| 2014/0046896 A1 | 2/2014 | Potter |
| 2014/0074402 A1 | 3/2014 | Hassib et al. |
| 2014/0081670 A1 | 3/2014 | Lim et al. |
| 2014/0188638 A1 | 7/2014 | Jones et al. |
| 2014/0197967 A1 | 7/2014 | Modica et al. |
| 2014/0207497 A1 | 7/2014 | Collins et al. |
| 2014/0232592 A1 | 8/2014 | Psiaki et al. |
| 2014/0244150 A1 | 8/2014 | Boesch et al. |
| 2014/0244156 A1 | 8/2014 | Magnusson et al. |
| 2014/0288765 A1 | 9/2014 | Elwart et al. |
| 2014/0288828 A1 | 9/2014 | Werner et al. |
| 2014/0358321 A1 | 12/2014 | Ibrahim |
| 2014/0358394 A1 | 12/2014 | Picciotti |
| 2015/0025917 A1 | 1/2015 | Stempora |
| 2015/0084757 A1 | 3/2015 | Annibale et al. |
| 2015/0087264 A1 | 3/2015 | Goyal |
| 2015/0097703 A1 | 4/2015 | Baur |
| 2015/0112731 A1 | 4/2015 | Binion et al. |
| 2015/0187146 A1 | 7/2015 | Chen et al. |
| 2015/0229666 A1 | 8/2015 | Foster et al. |
| 2015/0233718 A1 | 8/2015 | Grokop |
| 2015/0246654 A1 | 9/2015 | Tadic et al. |
| 2015/0327034 A1 | 11/2015 | Abramson et al. |
| 2015/0329121 A1 | 11/2015 | Lim et al. |
| 2015/0332407 A1 | 11/2015 | Wilson et al. |
| 2015/0334545 A1 | 11/2015 | Maier et al. |
| 2016/0021238 A1 | 1/2016 | Abramson et al. |
| 2016/0033366 A1 | 2/2016 | Liu et al. |
| 2016/0042767 A1 | 2/2016 | Araya et al. |
| 2016/0048399 A1 | 2/2016 | Shaw |
| 2016/0059855 A1 | 3/2016 | Rebhan et al. |
| 2016/0068156 A1 | 3/2016 | Horii |
| 2016/0086285 A1 | 3/2016 | Jordan et al. |
| 2016/0129913 A1 | 5/2016 | Boesen |
| 2016/0133130 A1 | 5/2016 | Grimm et al. |
| 2016/0150070 A1 | 5/2016 | Goren et al. |
| 2016/0171521 A1 | 6/2016 | Ramirez et al. |
| 2016/0174049 A1 | 6/2016 | Levy et al. |
| 2016/0189303 A1 | 6/2016 | Fuchs |
| 2016/0189442 A1 | 6/2016 | Wright |
| 2016/0225263 A1 | 8/2016 | Salentiny et al. |
| 2016/0232785 A1 | 8/2016 | Wang |
| 2016/0269852 A1 | 9/2016 | Meyers et al. |
| 2016/0272140 A1 | 9/2016 | Kim et al. |
| 2016/0282156 A1 | 9/2016 | Ott et al. |
| 2016/0325756 A1 | 11/2016 | Cordova et al. |
| 2016/0328893 A1 | 11/2016 | Cordova et al. |
| 2016/0339910 A1 | 11/2016 | Jonasson et al. |
| 2016/0358315 A1 | 12/2016 | Zhou et al. |
| 2016/0364983 A1 | 12/2016 | Downs et al. |
| 2016/0379310 A1 | 12/2016 | Madigan et al. |
| 2016/0379485 A1 | 12/2016 | Anastassov et al. |
| 2016/0381505 A1 | 12/2016 | Sankaran |
| 2017/0034656 A1 | 2/2017 | Wang et al. |
| 2017/0053461 A1 | 2/2017 | Pal et al. |
| 2017/0097243 A1 | 4/2017 | Ricci |
| 2017/0103342 A1 | 4/2017 | Rajani et al. |
| 2017/0103588 A1 | 4/2017 | Rajani et al. |
| 2017/0115125 A1 | 4/2017 | Outwater et al. |
| 2017/0116792 A1 | 4/2017 | Jelinek et al. |
| 2017/0124660 A1 | 5/2017 | Srivastava |
| 2017/0126810 A1 | 5/2017 | Kentley et al. |
| 2017/0138737 A1 | 5/2017 | Cordova et al. |
| 2017/0140293 A1 | 5/2017 | Vij et al. |
| 2017/0164158 A1 | 6/2017 | Watkins et al. |
| 2017/0178416 A1 | 6/2017 | Barreira Avegliano et al. |
| 2017/0178422 A1 | 6/2017 | Wright |
| 2017/0178424 A1 | 6/2017 | Wright |
| 2017/0210323 A1 | 7/2017 | Cordova et al. |
| 2017/0211939 A1 | 7/2017 | Cordova et al. |
| 2017/0232963 A1 | 8/2017 | Pal et al. |
| 2017/0234689 A1 | 8/2017 | Gibson et al. |
| 2017/0241791 A1 | 8/2017 | Madigan et al. |
| 2017/0279947 A1 | 9/2017 | Rajakarunanayake et al. |
| 2017/0289754 A1 | 10/2017 | Anderson et al. |
| 2017/0366940 A1 | 12/2017 | Fan et al. |
| 2017/0369055 A1 | 12/2017 | Saigusa et al. |
| 2017/0371608 A1 | 12/2017 | Wasserman |
| 2018/0061230 A1 | 3/2018 | Madigan et al. |
| 2018/0075309 A1 | 3/2018 | Sathyanarayana et al. |
| 2018/0090001 A1 | 3/2018 | Fletcher |
| 2018/0154908 A1 | 6/2018 | Chen |
| 2018/0158329 A1 | 6/2018 | Benhammou et al. |
| 2018/0164825 A1 | 6/2018 | Matus et al. |
| 2018/0165531 A1 | 6/2018 | Sathyanarayana et al. |
| 2018/0174446 A1 | 6/2018 | Wang |
| 2018/0211181 A1 | 7/2018 | Lei et al. |
| 2018/0276485 A1 | 9/2018 | Heck et al. |
| 2018/0308128 A1 | 10/2018 | Deluca et al. |
| 2018/0338223 A1* | 11/2018 | Park ............... H04W 4/027 |
| 2019/0005812 A1 | 1/2019 | Matus et al. |
| 2019/0007511 A1 | 1/2019 | Rodriguez et al. |
| 2019/0035266 A1 | 1/2019 | Riess et al. |
| 2019/0281416 A1 | 9/2019 | Watkins et al. |
| 2019/0295133 A1 | 9/2019 | Hirtenstein et al. |
| 2020/0391755 A1 | 12/2020 | Lerner et al. |
| 2021/0038979 A1* | 2/2021 | Bleasdale-Shepherd ............... G07F 17/3225 |
| 2021/0123749 A1 | 4/2021 | Kreig et al. |
| 2021/0156705 A1 | 5/2021 | Pietryka et al. |
| 2021/0287262 A1 | 9/2021 | Abbott et al. |
| 2022/0348256 A1 | 11/2022 | Melkote et al. |
| 2023/0134342 A1 | 5/2023 | Chandra et al. |

FOREIGN PATENT DOCUMENTS

| | | |
|---|---|---|
| CN | 108431839 A | 8/2018 |
| CN | 108819841 A | 11/2018 |
| DE | 3439000 A1 | 4/1986 |
| DE | 102008008555 | 8/2008 |
| DE | 102017221643 A1 | 7/2018 |
| EP | 0534892 A1 | 3/1993 |
| GB | 2492369 B | 4/2014 |
| JP | 2000009482 A | 1/2000 |
| JP | 2002215236 A | 7/2002 |
| JP | 2005098904 A | 4/2005 |
| JP | 2007212265 A | 8/2007 |
| JP | 2009133702 A | 6/2009 |
| JP | 2011133240 A | 7/2011 |
| JP | 2013195143 A | 9/2013 |
| JP | 2013200223 A | 10/2013 |
| KR | 20130106106 A | 9/2013 |
| WO | 2004085220 | 10/2004 |
| WO | 2015122729 A1 | 8/2015 |

OTHER PUBLICATIONS

Chu, Hon Lung, "In-Vehicle Driver Detection Using Mobile Phone Sensors", https://ece.duke.edu/sites/ece.duke.edu/files/ GWDD2011_Chu.pdf-2011 (Year: 2011).

Giuseppe, Guido , et al., "Using Smartphones as a Tool to Capture Road Traffic Attributes", Applied Mechanics and Materials vol. 432 (2013) pp. 513-519.

Jiangqiang , et al., "Driver Pre-Accident Operation Mode Study Based on Vehicle-Vehicle Traffic Accidents", 2011, Publisher: IEEE.

Kalra, Nidhi , "Analyzing Driving and Road Events via Smartphone", International Journal of Computer Applications (0975-8887), vol. 98—No. 12, Jul. 2014, pp. 5-9.

Liang-Bi , et al., "An Implementation of Deep Learning based IoV System for Traffic Accident Collisions Detection with an Emergency Alert Mechanism", 2018, Publisher: IEE.

Mohan, Prashanth , et al., "Nericell: Rich Monitoring of Road and Traffic Conditions using Mobile Smartphones", SenSys '08, Nov. 5-7, 2008, Raleigh, North Carolina., Feb. 28, 2018 00:00:00.0.

Pattara-Atikom, W. , et al., "Estimating Road Traffic Congestion using Vehicle Velocity", 2006, Publisher: IEEE.

Short, Jeffrey , et al., "Identifying Autonomous Vehicle Technology Impacts on the Trucking Industry", http://atri-online.org/wp-content/uploads/2016/11/ATRI-Autonomous-Vehicle-Impacts-11-2016.pdf (Year: 2016).

(56) References Cited

OTHER PUBLICATIONS

Tathagata, Das, et al., "PRISM: Platform for Remote Sensing using Smartphones", In. Proc. Mobisys '10, Jun. 15-18, 2010, San Francisco, USA, pp. 63-76.

Walter, D., et al., Novel Environmental Features for Robust Multisensor Navigation.

\* cited by examiner

SYSTEM AND METHOD FOR TRIP CLASSIFICATION

CROSS REFERENCE TO RELATED APPLICATIONS

This application claims the benefit of U.S. Provisional Application No. 63/285,650, filed 3 Dec. 2021, which is incorporated herein in its entirety by this reference.

TECHNICAL FIELD

This invention relates generally to the vehicular activity monitoring field, and more specifically to a new and useful system and/or method for monitoring vehicle-related user activity and vehicle motion in the vehicular activity monitoring field.

DESCRIPTION OF THE PREFERRED EMBODIMENTS

Figure 1:
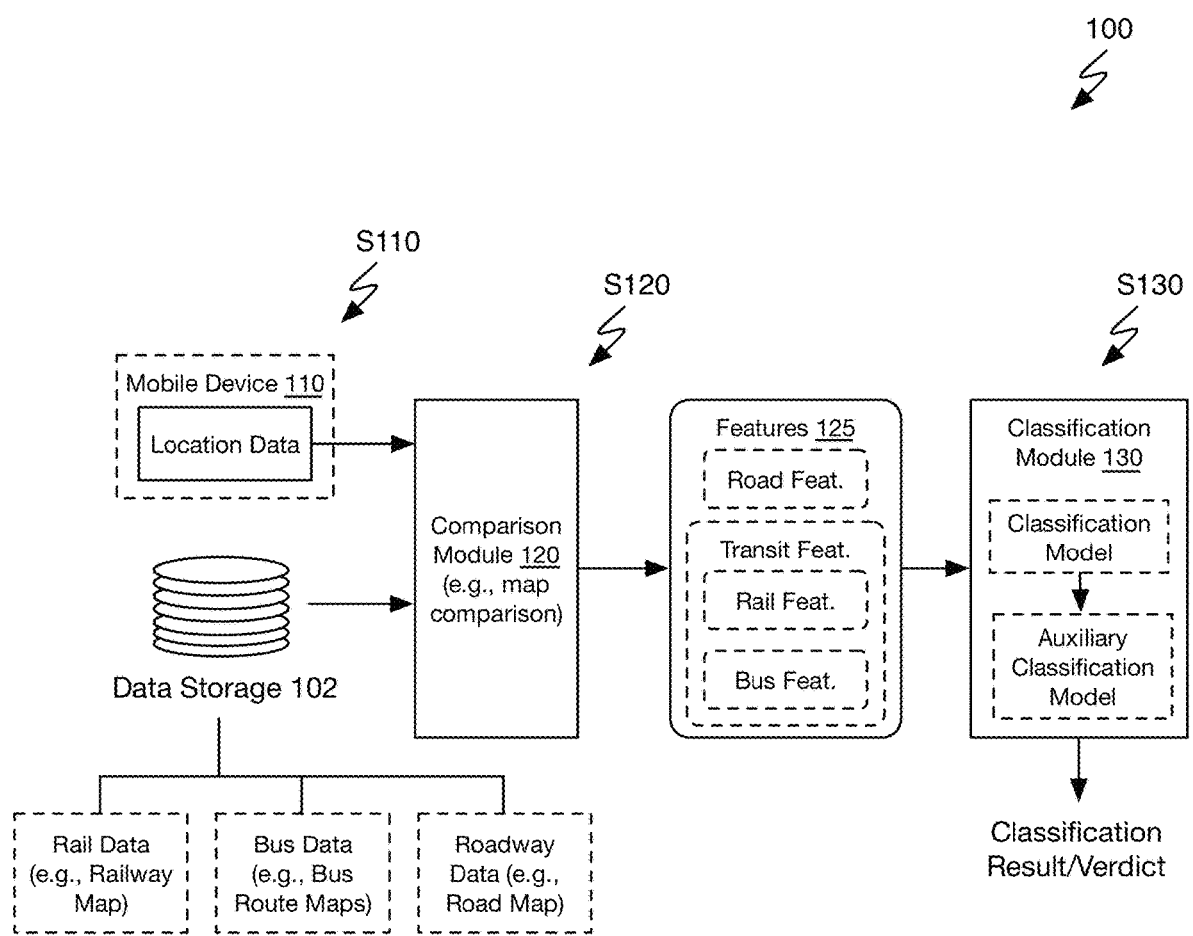
FIG. 1 is a schematic representation of a variant of the system.

The following description of the preferred embodiments of the invention is not intended to limit the invention to these preferred embodiments, but rather to enable any person skilled in the art to make and use this invention.

1. Overview.

The system 100 can include a comparison module 120 and a classification module 130. The system can optionally include and/or be used with: a mobile device 110 and a data storage 102 (e.g., a map database). However, the system 100 can additionally or alternatively include any other suitable set of components. The system functions to facilitate a classification of a transportation modality for vehicle trips based on location data (e.g., collected at a mobile device). Additionally or alternatively, the system can function to facilitate execution of method Block S100 and/or S300.

Figure 9:
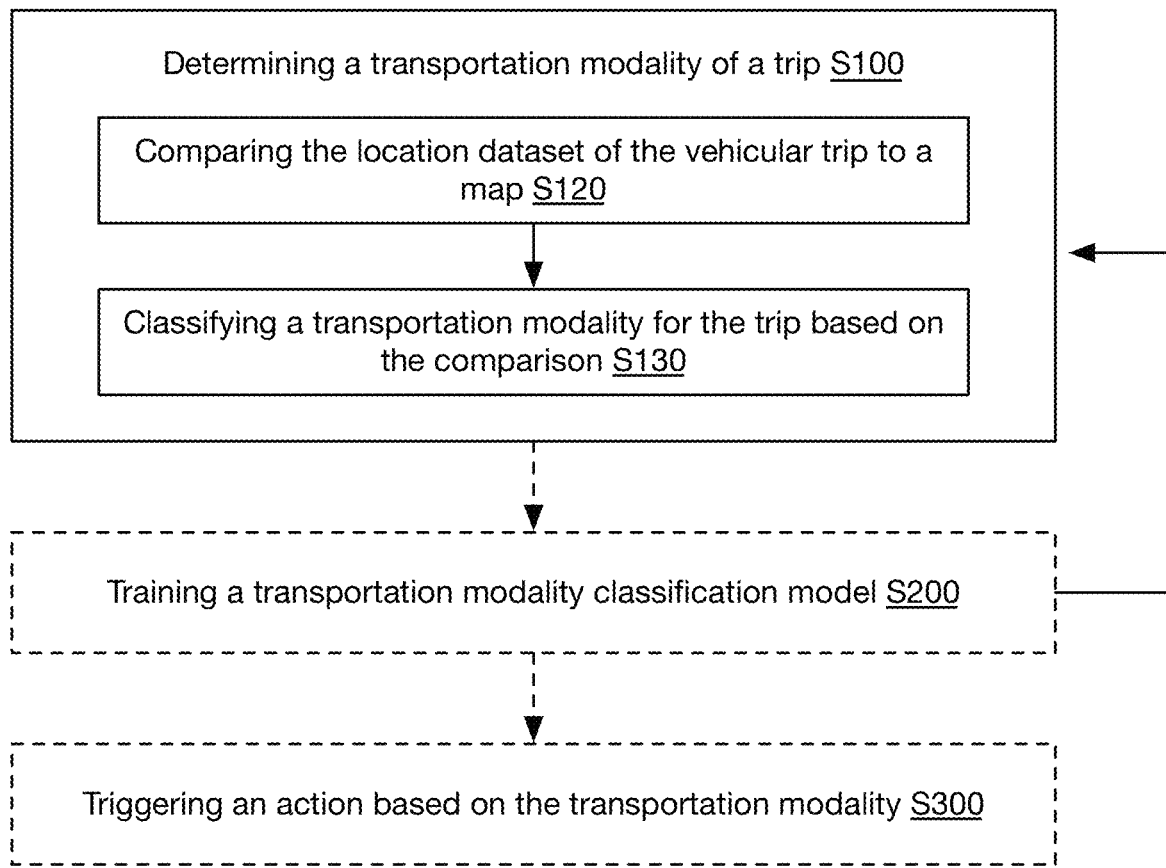
FIG. 9 is a flowchart diagram of a variant of the method.

The method, an example of which is shown in FIG. 9, can include: optionally training a transportation modality classification model S200; determining a transportation modality of a trip S100; and optionally triggering an action based on the transportation modality S300. However, the method can additionally or alternatively include any other suitable elements. The method functions to facilitate a classification of a transportation modality for trips based on location data (e.g., collected at a mobile device). Additionally or alterna-tively, the method can function to facilitate content provisions based on a trip classification.

Figure 2:
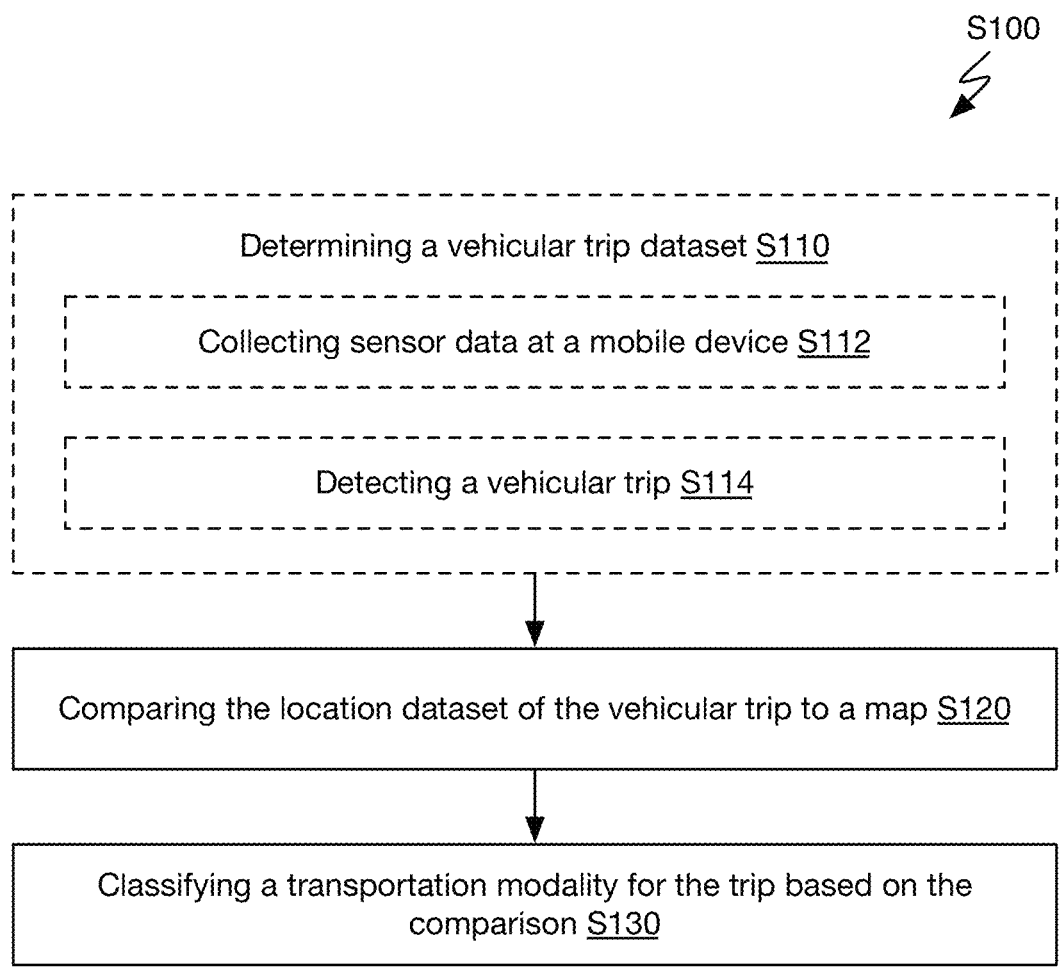
FIG. 2 is a flowchart diagram of a variant of the method.

Block S100, an example of which is shown in FIG. 2, can include: comparing a location dataset of the vehicular trip to a map S120; classifying a transportation modality for the vehicular trip based on the comparison S130; and/or any other suitable elements. Block S100 functions to classify the transportation modality of trips based on mobile device localization data, such as may be used to provide content (e.g., to a user via the mobile device; to a remote entity, etc.).

1.1 Variants.

In a first set of variants, a method for classification of vehicle trip transportation modality can include: automatically detecting a vehicle trip associated with vehicular transportation of the mobile user device; receiving a location dataset comprising location data collected with a location sensor of the mobile user device; contemporaneously comparing the location dataset with a plurality of predetermined datasets, including: determining a first plurality of features based on a first comparison between the location dataset and a railway dataset; determining a second plurality of features based on a second comparison between the location dataset and a bus route dataset; and determining a third plurality of features based on a third comparison between the location dataset and a roadway dataset; classifying the vehicle trip based on the first, second, and third pluralities of features; and based on the classification of the vehicle trip, triggering an action at the mobile user device (e.g., providing insurance content, providing driver feedback, updating a usage-based insurance policy, providing navigational assistance, etc.).

In a second set of variants, nonexclusive with the first set, a method for classification of vehicle trip transportation modality includes: receiving a trip dataset for a vehicle trip associated with vehicular transportation of a mobile user device, the trip dataset including location data collected with a location sensor of the mobile user device; determining a first set of features by comparing the trip dataset to a transit dataset; determining a second set of features by comparing the trip dataset to a roadway driving dataset; based on the first and second sets of features, classifying the vehicle trip as an off-road vehicle trip; and based on the classification of the vehicle trip as an off-road trip, triggering an action at the mobile user device.

2. Benefits.

First, variations of this technology can leverage non-generic location data (e.g., location datasets, GPS data, etc.) to conveniently and unobtrusively classify a vehicular transport modality (e.g., driving trip, public transit trip, off-road transportation, etc.). In variants, vehicular transport modalities can be classified during a trip (e.g., before the conclusion of the driving session; in real time or near real time; periodically) which can be useful for initiation of safety algorithms, provision of business content (e.g., personalized content) to a user, and/or collision detection algorithms (e.g., where a phone may be damaged during an accident, etc.). In examples, the location data can be passively collected at a user's mobile computing device (e.g., a smartphone, a tablet, etc.), such that the data collection and/or method can be performed without requiring a user to purchase additional hardware (e.g., a specialized onboard device for monitoring traffic-related events, a purpose-built such device, etc.). In variants, the technology can be used to determine a vehicle transportation modality associated with a trip detected as described in U.S. application Ser. No. 16/201,955, filed 27 Nov. 2018, which is incorporated herein in its entirety by this reference. In variants, the technology can be used to distinguish/classify train trips, public roadway transit trips, roadway driving trips, and/or off-road driving trips (e.g., airplane trip, zip-line trip, skiing trip, park/amusement ride trip, golf cart trip, beach vehicle trip, boat trip, ferry trip, etc.) based on location data.

Second, the technology can improve the technical fields of at least vehicle telematics, inter-vehicle networked communication, computational modeling of traffic-related events, and traffic-related event determination with mobile computing device data. The technology can take advantage of the non-generic sensor data and/or be used with supplemental data (e.g., maps; vehicle sensor data, weather data, traffic data, environmental data, biometric sensor data, etc.) to better improve the understanding of correlations between such data and traffic-related events and/or responses to such events, leading to an increased understanding of variables affecting user behavior while driving and/or riding in a vehicle (e.g., bus, train, etc.) and/or traffic behavior at the scale of a population of users driving vehicles. In a first variant, the technology can be used to determine a transportation modality to be used in conjunction with the accident detection and/or response methods as described in U.S. application Ser. No. 15/243,565, filed 22 Aug. 2016, which is incorporated herein in its entirety by this reference. In a second variant, the technology can be used to classify of vehicular transportation modalities from sensor data which can be used to infer traffic laws when used in conjunction with U.S. application Ser. No. 16/022,184, filed 28 Jun. 2018, which is incorporated herein in its entirety by this reference.

Third, the technology can provide technical solutions necessarily rooted in computer technology (e.g., automatic data collection via a mobile computing platform, utilizing computational models to characterize vehicle transportation modalities and/or determining traffic-related events from non-generic sensor datasets collected at mobile computing devices, updating the computational models based on event determination and/or communication accuracy, etc.) to overcome issues specifically arising with computer technology (e.g., issues surrounding how to leverage location data collected by a mobile computing device to determine traffic-related events, how to automatically communicate traffic-related information to initiate traffic-related actions for responding to traffic-related characterization, etc.).

Fourth, the technology can leverage specialized computing devices (e.g., computing devices with GPS location capabilities, computing devices with motion sensor functionality, wireless network infrastructure nodes capable of performing edge computation, etc.) to collect specialized datasets for characterizing traffic behaviors executed by the vehicle (e.g., under the influence of the driver's control, when controlled by an autonomous control system, etc.).

Fifth, variants can facilitate classification in substantially real time (e.g., real time, near real time [NRT], less than screen refresh rate, less than 0.1 seconds, less than 1 second, etc.) which can improve user experiences interacting with mobile applications/services. Such variants can utilize parallelized computation/processing for feature generation across various modalities (e.g., roadway, rail, bus, etc.), which may facilitate allow actions and/or content provisions at the mobile device without substantial delays (e.g., which may be associated with serial generation of features for various modalities). For example, upon completion of a vehicle trip, a user may attempt to access a driver score or driving feedback associated with a mobile insurance application, where timely computation of features and/or trip classification may enable this feedback to be provided without noticeable delay (e.g., which may be particularly important in cases where a user only briefly accesses the application, such as for 3 seconds, following a trip). As a second example, real time classification may facilitate (forward) compatibility across a variety of mobile operating systems (e.g., without relying on background and/or remote computation, for example).

However, variations of the technology can additionally or alternately provide any other suitable benefits and/or advantages.

3. System.

The system 100, an example of which is shown in FIG. 1, can include a comparison module 120 and a classification module 130. The system can optionally include and/or be used with: a mobile device 110 and a data storage 102 (e.g., a map database). However, the system 100 can additionally or alternatively include any other suitable set of components. The system functions to facilitate a classification of a transportation modality for vehicle trips based on location data (e.g., collected at a mobile device). Additionally or alternatively, the system can function to facilitate execution of method Block S100 and/or S300.

The system can include or be used with a mobile device 110 which functions to collect location data. Examples of the mobile device include a tablet, smartphone, mobile phone, laptop, watch, wearable devices, or any other suitable mobile device. The mobile device can include power storage (e.g., a battery), processing systems (e.g., CPU, GPU, memory, etc.), sensors, wireless communication systems (e.g., a WiFi transceiver(s), Bluetooth transceiver(s), cellular transceiver(s), etc.), or any other suitable components. The sensors of the mobile device can include vehicular movement sensors, which can include: location sensors (e.g., GPS, GNSS, etc.), inertial sensors (e.g., IMU, accelerometer, gyroscope, magnetometer, etc.), motion sensors, force sensors, orientation sensors, altimeters, and/or any other suitable movement sensors; user-facing sensors, which can include: cameras, user input mechanisms (e.g., buttons, touch sensors, etc.), and/or any other suitable user-facing sensors; and/or any other suitable sensors.

The sensors (e.g., location sensor; GPS/GNSS) of the mobile device can generate location data: periodically (e.g., greater than 10 Hz, 10 Hz, 1 Hz, 0.1 Hz, less than 0.1 Hz, any range bounded by the aforementioned values, etc.), aperiodically, in response to a geofence trigger (e.g., every 10 meters, every 100 meters, etc.), and/or with any other suitable timing/frequency. Location data can be collected with a precision and/or accuracy within: 0.5 meters, 1 meter, 5 meter, 10 meters, 100 meters, any range bounded by the aforementioned values, and/or any other suitable positional tolerance(s), which can be provided with location data points (e.g., which can be used to filter/weight various location data points during S100).

However, the system can include and/or be used with any other suitable mobile device(s); and/or can receive location data from any other suitable endpoint(s).

The system can include or be used with data storage 102 database which can be used to match/compare location data for a trip to routes associated with various transportation modalities (e.g., roadways, railways, walkways, bus routes, etc.). The data storage can include: a map database(s) (e.g., road maps, railway maps, public transit maps, trail maps, transportation modal boundary maps, etc.), historical route data (e.g., features extracted for prior trips), transit data, and/or any other suitable data. In variants, the data storage can additionally or alternatively include public transit routes and/or route segments, GTFS data, and/or any other suitable route/scheduling information. Map data and/or regional/ local portions of maps can be stored locally within a memory of the mobile device, stored in a remote database (e.g., cloud storage, external reference database, etc.), and/or otherwise suitably stored/referenced. Maps can be updated: periodically (e.g., daily, annually, etc.), aperiodically (e.g., in response to an external database update, etc.), based on a location of the mobile device, and/or with any other suitable frequency. Alternatively, maps can be externally controlled/updated, and/or can be otherwise not updated.

In variants, maps can be grouped, aggregated, and/or stored based on a corresponding transportation modality. For instance, a roadway map (e.g., with overlaid bus routes) can be considered as inherently corresponding to driving trips and/or automobile transportation modality (e.g., cars, etc.). Likewise, a railway map can be considered as inherently corresponding to train/rail trips and/or a rail transportation modality.

Additionally or alternatively, variants can utilize modality restriction maps, and/or predetermined transportation area boundaries, such as for airports/airstrips, bodies of water, and/or other regions in which transportation modalities may be limited, to facilitate classification of various forms of off-road transportation (e.g., aircraft, watercraft, etc.).

However, the system can otherwise exclude data storage and/or map databases, may access data from a remote map database, and/or may otherwise reference maps, historical route data, and/or public transit route schedules.

The comparison module 120 functions to determine a set of features 125 which can be used for classification by the classification module. Additionally or alternatively, the comparison module can function to compare location data (e.g., GPS data) from the mobile device to a map, such as in accordance with Block S120 of the method. The comparison module preferably generates features which are modality specific and/or map specific, wherein subsets of features are respectively associated with each of a plurality of transportation modalities. As an example, the comparison module can separately determine a set of roadway features, a set of bus features, and a set of rail features, generated with separate stored rail data (e.g., a railway map), bus data (e.g., bus route maps), and roadway data (e.g., road map), respectively. The features 125 can include: roadway features (e.g., the comparison module can generate roadway features by comparing location data to a roadmap), railway features (e.g., the comparison module can generate railway features by comparing location data to a rail map), public transit features (e.g., the comparison module can generate public transit features by comparing location data to a public transit route map), and/or any other suitable features. However, the comparison module can generate any other suitable features.

In variants, features and/or map comparisons for various modes of transportation can be determined synchronously, simultaneously, and/or contemporaneously (e.g., via separate, parallel computation), which may facilitate feature generation, and subsequent classification by the classification module, in real time or substantially real time (e.g., NRT).

Figure 3:
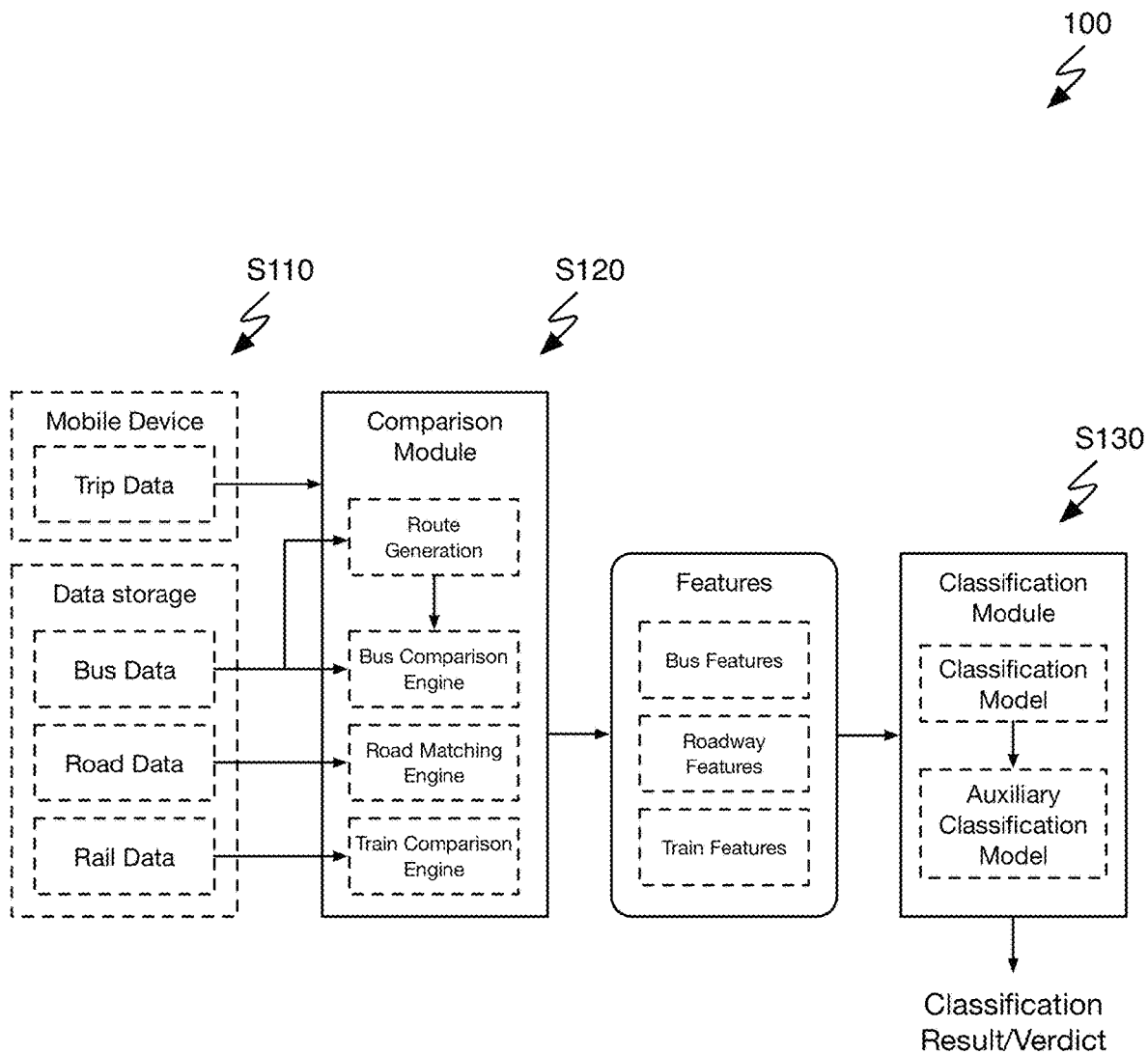
FIG. 3 is a schematic representation of a public transit classification in a variant of the system.

In variants, the comparison module can include a candidate route generator (e.g., an example is shown in FIG. 3), which functions to determine a set of candidate public transit routes which are within a threshold distance of one or more location datapoints. As an example, a candidate route can include a sequence of route segments (e.g., bus A from stop X1 to stop X2; bus B from stop Y1 to Y2, etc.) corresponding to each location datapoint of a trip.

Figure 6:
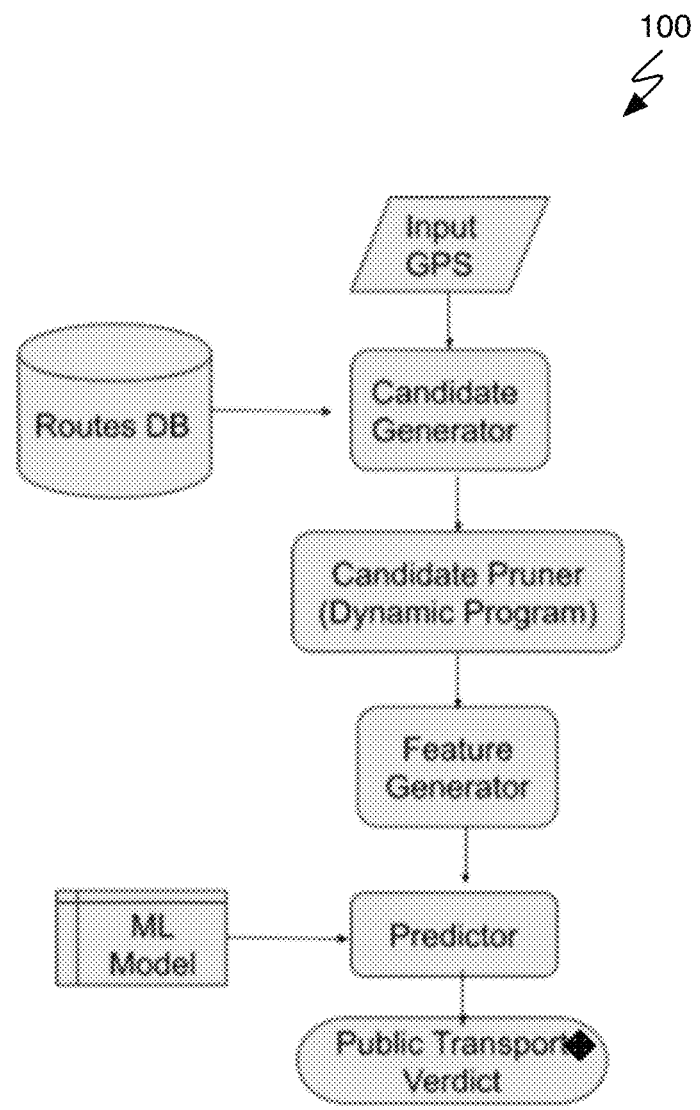
FIG. 6 is a schematic representation of an example of trip classification in a variant of the system and/or method.

In variants, the comparison module can optionally include a candidate pruner (e.g., an example is shown in FIG. 6), which functions to refine the set of candidate routes. The candidate pruner preferably refines the set of candidate routes using a dynamic program and/or process, but can additionally or alternatively refine/prune the set of candidates using predetermined rules, heuristics, decision trees, probabilistic graphical models, probability distributions, and/or other models. As an example, the candidate pruner can limit the set of candidate routes to all routes having less than a threshold number of transfers between public transit lines (e.g., bus/train transfers), such as less than 2, 3, 4, 5, 6, any range bounded by the aforementioned values, and/or any other suitable maximum number of transfers (e.g., which may minimize creep in the total available set of combinations of transit lines, particularly where lines include multiple overlapping route segments). As a second example, the candidate pruner can limit the number of transfers between public transit lines within a geographic region (e.g., span of a city block) and/or within a threshold time period (e.g., maximum of 1 line transfer per minute, etc.). As a third example, the candidate pruner can refine the set of candidate routes based on a motion vector (e.g., average motion vector for a set of two or more location datapoints, between adjacent location datapoints, etc.) and/or direction vector associated with a map (e.g., one-way streets, direction of a bus/train line). For instance, route candidates may be eliminated from further consideration if they correspond to motion opposite a direction of traffic or opposite a direction of a public transit line. As a fourth example, the candidate pruner can select highest probability route candidates based on a threshold probability and/or a maximum predetermined number (N) candidates with the highest matching scores (e.g., RMS distance to route/roadway, DTW similarity score, etc.). However, the candidate pruner can otherwise suitably refine the set of candidate public transit routes; or, alternatively, the comparison module can operate without a candidate pruner.

Figure 4A:
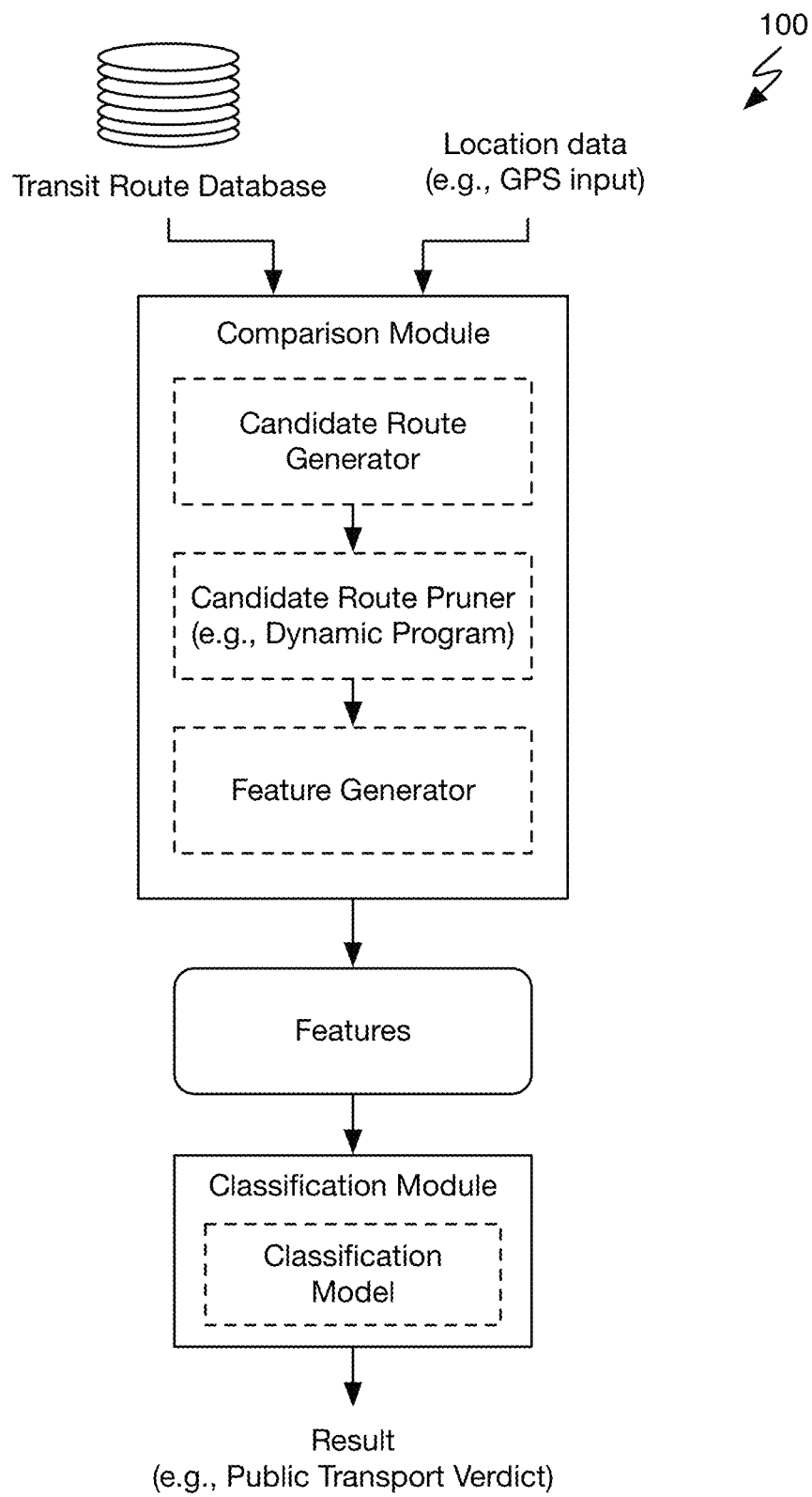
FIG. 4A is a schematic representation of a trip classification in a variant of the system.
Figure 4B:
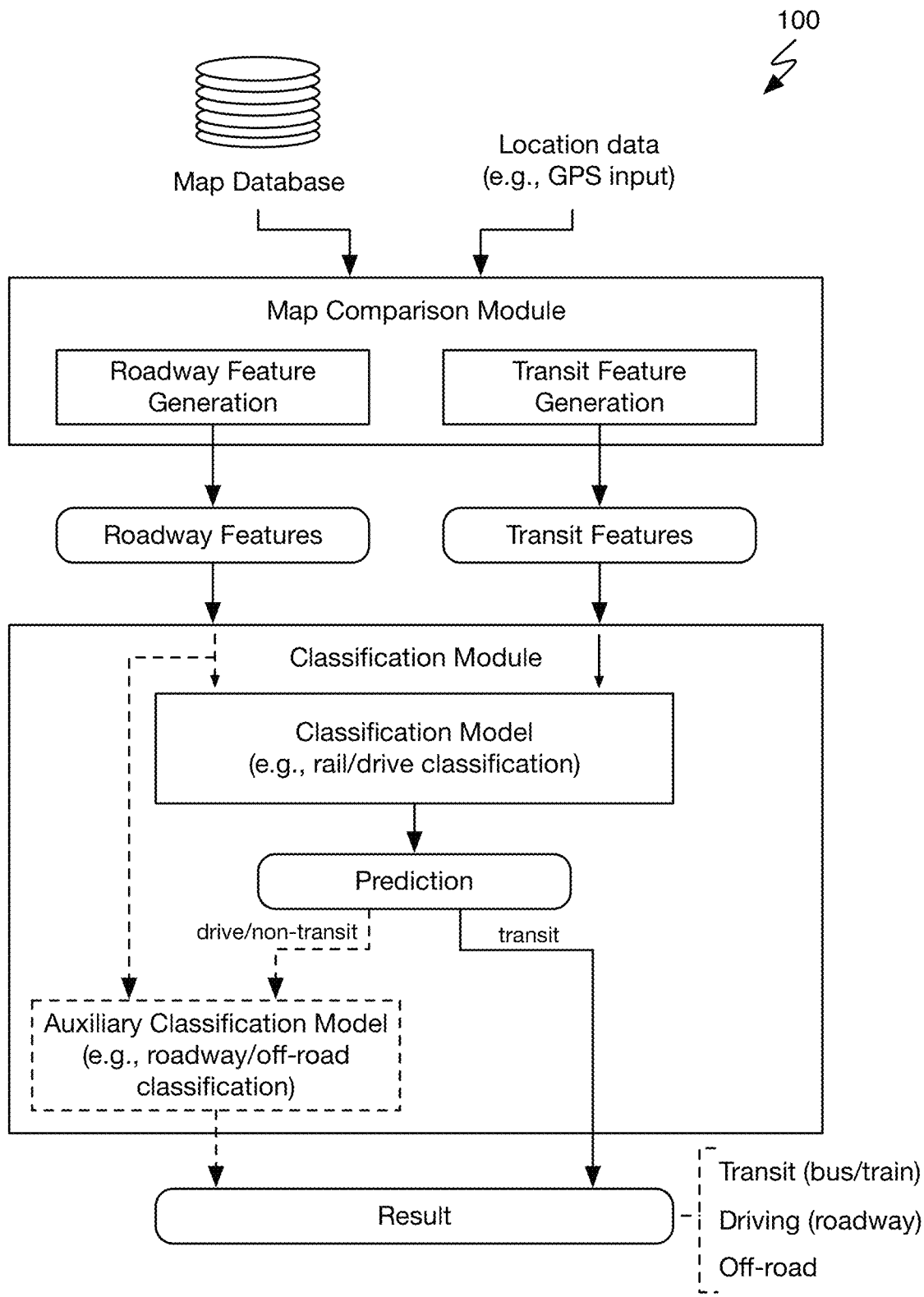
FIG. 4B is a schematic representation of a trip classification in a variant of the system.
Figure 5:
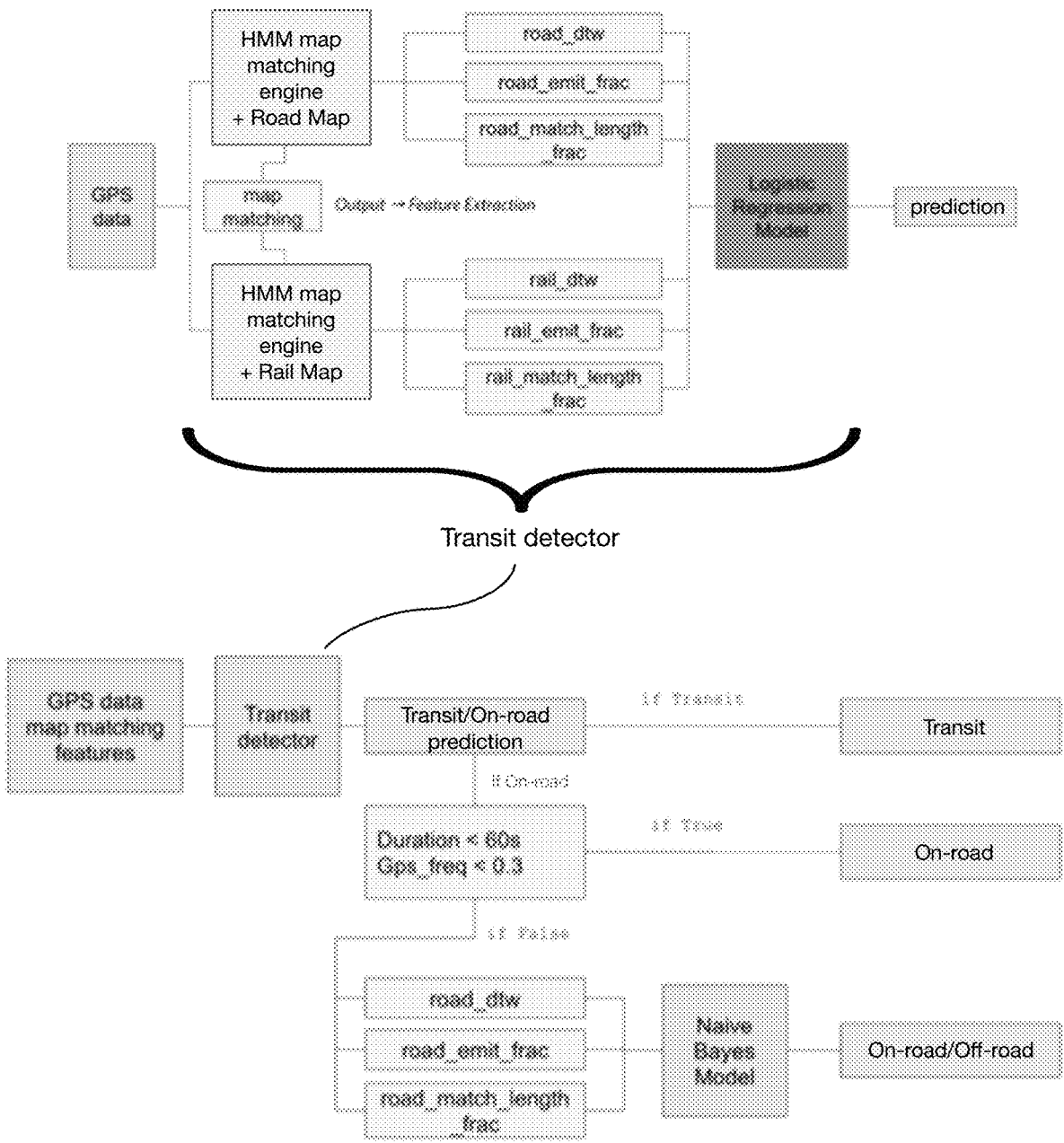
FIG. 5 is a schematic representation of an example of trip classification in a variant of the system and/or method.

In variants, the comparison module 120 can directly extract features from the location data for a corresponding set of maps (e.g., an example is shown in FIG. 4B; using an HMM comparison). In a first example, the comparison module can separately compare the location dataset (e.g., a GPS trail) to a map (e.g., a roadway network, a train network, a public transit network, etc.), and output a corresponding set of matching characteristics/features (e.g., an example is shown in FIG. 5), which can include: a similarity metric (e.g., dynamic time warping [DTW] similarity score; dissimilarity score, etc.), a length fraction which matches to the map (e.g., within a predetermined deviation/distance threshold, etc.), a maximum length and/or length fraction of portions not matching the map (e.g., exceeding threshold deviation distance; fraction of trip data points that matched with at least one route, etc.), and/or any other suitable matching features.

In variants, the comparison module can optionally filter out or otherwise eliminate from further consideration a subset of location datapoints to increase the accuracy of the comparison, such as location datapoints where the vehicle is stationary (e.g., which may be largely redundant and/or may not represent vehicular movement data), location datapoints where data is noisy or confounding (e.g., from within a tunnel, etc.), location datapoints having low accuracy, and/or otherwise deviant/anomalous location data. Additionally or alternatively, location data can be filtered based on other sensor data from the mobile device (e.g., motion data, based on characterization of user behaviors and/or vehicle actions, etc.), and/or otherwise suitably evaluated. Alternatively, all location datapoints can be compared to the map and/or used for subsequent classification of the vehicular transport modality.

In a specific example, the comparison module can extract features from the location data using a hidden Markov Model (HMM)-based comparison.

However, the system can include any other suitable comparison module.

The classification module functions to classify the vehicular transport modality, such as in accordance with Block S130. The classification module can include a binary classifier, a multi-class classifier, a neural network model (e.g., DNN, CNN, RNN, etc.), a logistic regression model, Bayesian networks (e.g., naïve Bayes model), a cascade of neural networks, compositional networks, Markov chains, decision trees, predetermined rules, probability distributions, heuristics, probabilistic graphical models, and/or other models.

In one variant, the classification module can include a first classification model which functions to generate a first prediction comprising a probability or score specifying whether a trip is a driving trip or a rail (transit) trip. The classification module can optionally include an auxiliary classification model which functions to determine a second prediction for driving trips, which can include a probability or score specifying whether a driving trip is associated with roadway driving or off-road driving. Accordingly, the classification module can generate a multi-class classification result for the trip as the greatest probability (highest score) between: rail (transit), roadway (automotive) driving, and off-road driving.

In a specific example of this variant (e.g., as shown in FIG. 5), the first classification model is in the form of a logistic regression model and the auxiliary classification model is in the form of a Naïve Bayes model.

Figure 7:
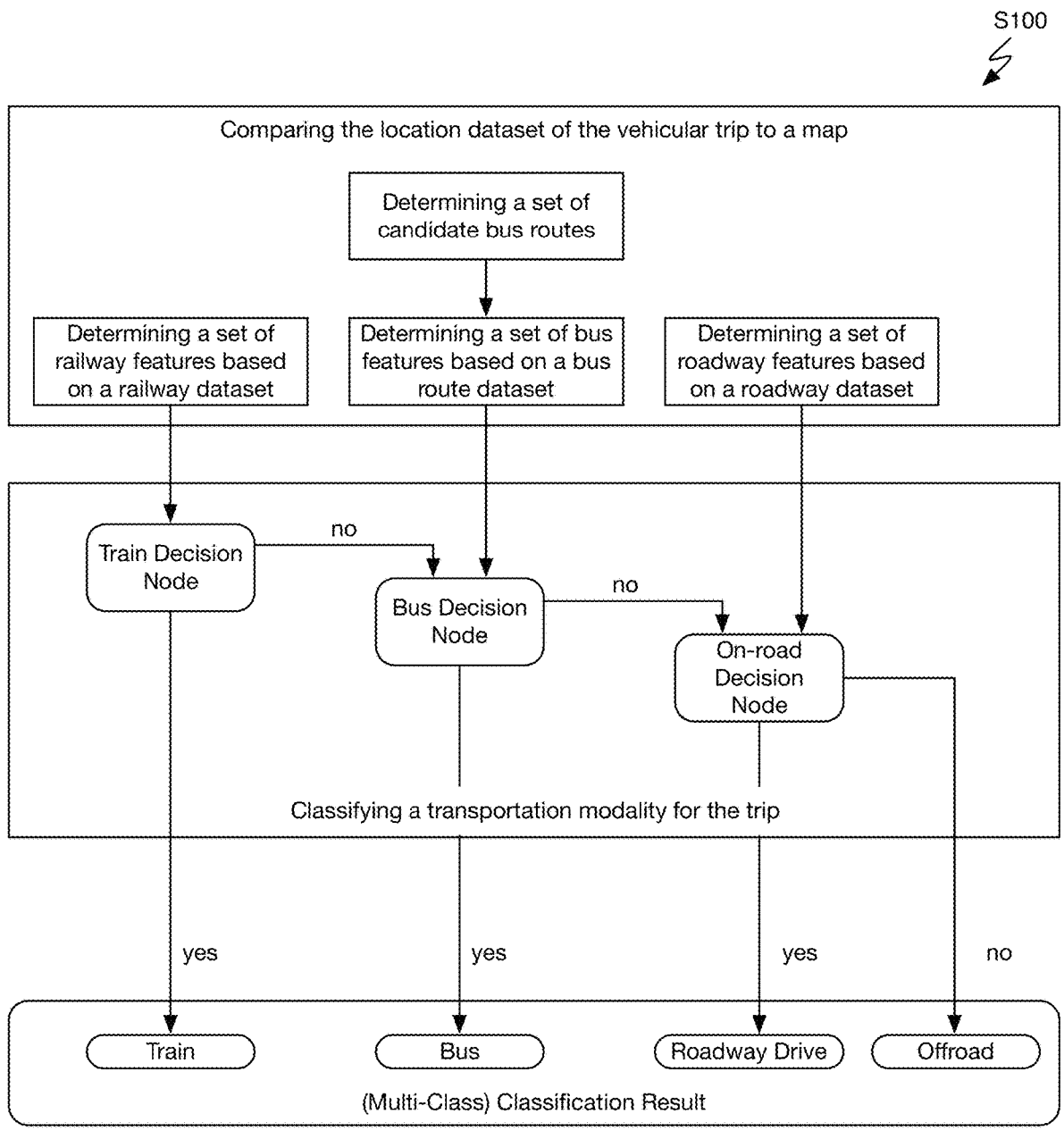
FIG. 7 is a schematic flowchart representation of a trip classification in a variant of the method.

In one variant, the classification module can generate a multi-class decision by with a series of binary classifications (e.g., an example is shown in FIG. 7), each respectively associated with a predetermined classifier for particular transportation modality (and/or subset of modality specific features). For example, rail classifications may be relatively higher accuracy and/or more computationally efficient, since location data may be the least noisy for train trips and/or the route may greatly deviate relative to roadway maps. As such, rail trips may be classified upstream of driving trips to reduce errors and/or additional computation bandwidth associated with more complex determinations (e.g., as it may be more difficult to distinguish between a car and a bus trip which follow a similar route). In a first example, the classification module can include a tree-based model, wherein driving trips are classified downstream of a train classification decision node (e.g., in response to a determination that a trip is not a rail trip, via a train classification model). In a second example, the classification module can include a first, second, and third binary classifier associated with train, bus, and on-road driving classifications, respectively.

In variants, trip modalities are preferably classified based on the respective set of features, generated based on a comparison of the trip location data to a map associated with the transportation modality. Additionally or alternatively, the classification module can rely on differential comparisons (or contrasting features resulting therefrom) corresponding one or more remaining modalities. For instance, a railway classification can be based on both the similarity of the trip location dataset to a railway map (e.g., length fraction of trip matching a railway map) and a differential comparison of the trip location dataset to a roadway map (e.g., length fraction of the trip which cannot be matched to a road map, for example).

Additionally or alternatively, the models can have other different architectures, the same architecture, and/or be otherwise suitably configured.

However, the system can include any other suitable classification module.

The comparison module and/or the classification module can include processing nodes/endpoints, where the processing can be performed: locally (e.g., at the mobile device, client side, edge computation, etc.), remotely (e.g., cloud processing, data processing at a remote server, etc.), at the same endpoints (e.g., all local to the mobile device, all remote from the mobile device), at different endpoints, and/or can include any other suitable processing. As an example, the comparison module and the classification module can be within the mobile device, which may provide low-latency and/or scalable computation capabilities.

Figure 8:
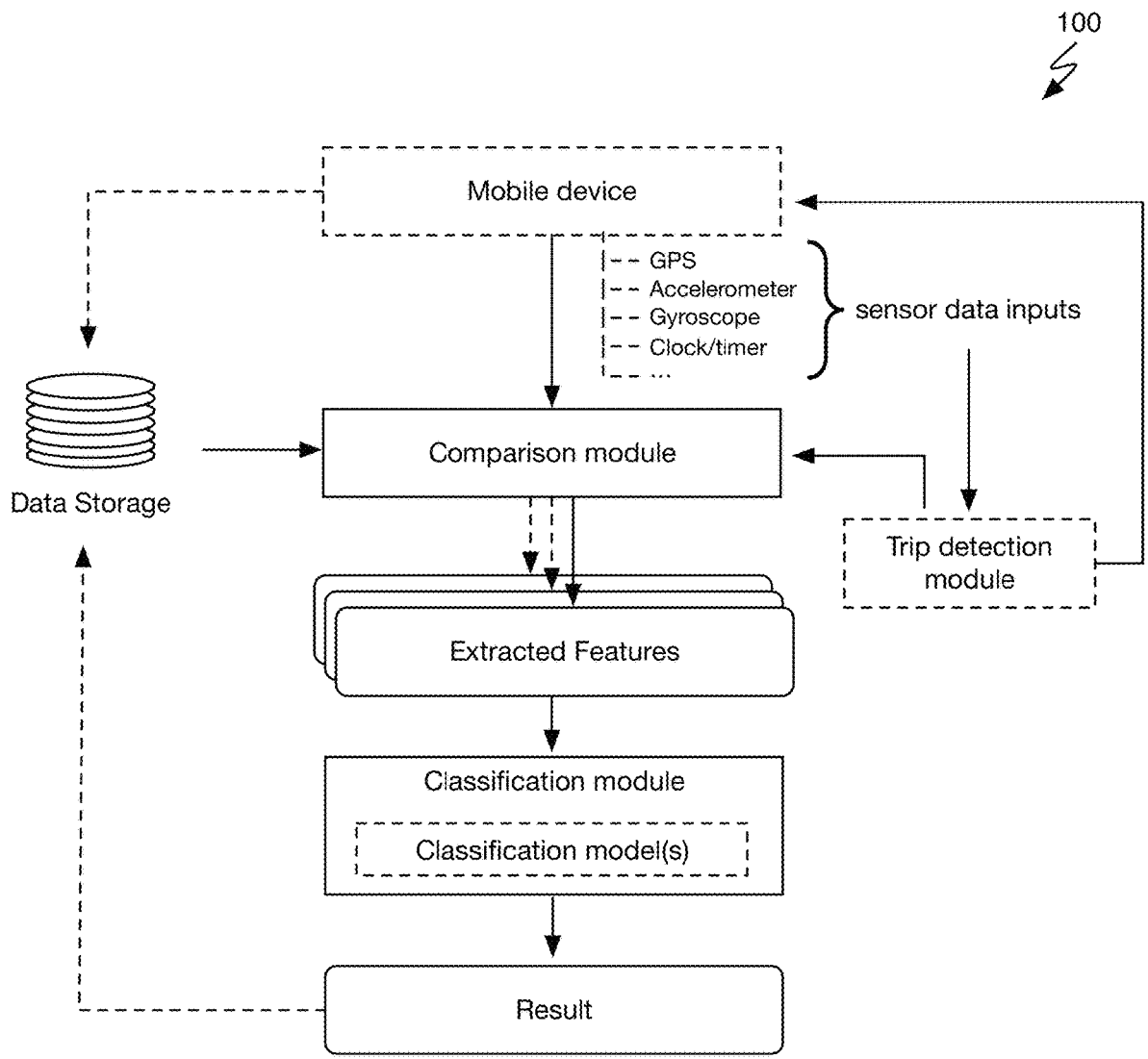
FIG. 8 is a schematic representation of a variant of the system.

In variants (e.g., an example is shown in FIG. 8), the system can include or be used with a trip detection module/system, such as the trip detection system as described in U.S. application Ser. No. 16/201,955, filed 27 Nov. 2018, which is incorporated herein in its entirety by this reference. Accordingly, the system can execute Block S100 in response to a trip detection by the trip detection system. Additionally or alternatively, the system can be configured to execute Block S100 during a vehicular trip, asynchronously with vehicle trips and/or vehicular navigation, and/or with any other suitable timing.

However, the system can include any other suitable components.

4. Method.

The method, an example of which is shown in FIG. 9, can include: determining a transportation modality of a trip S100; optionally training a transportation modality classification model S200; and optionally triggering an action based on the transportation modality S300. However, the method can additionally or alternatively include any other suitable elements. The method functions to facilitate a classification of a transportation modality for vehicle trips based on location data (e.g., collected at a mobile device). Additionally or alternatively, the method can function to facilitate content provisions based on a trip classification.

Block S100, an example of which is shown in FIG. 2, can include: optionally determining a vehicular trip dataset S110, comparing the location dataset of the vehicular trip to a map S120; classifying a transportation modality for the vehicular trip based on the comparison S130; and/or any other suitable elements. Block S100 functions to classify the transportation modality of trips based on mobile device localization data, such as may be used to provide content (e.g., to a user via the mobile device; to a remote entity, etc.). In variants, S100 can occur in response to a vehicular trip detection by the trip detection system(s) and/or method(s) as described in U.S. application Ser. No. 16/201,955, filed 27 Nov. 2018, which is incorporated herein in its entirety by this reference.

4.1 Data Collection.

Determining the vehicular trip dataset S110 functions to determine the location dataset of the vehicular trip to be used for subsequent features generation (e.g., via the comparison module) and trip classification. In a preferred variant, the vehicular trip dataset is determined locally (e.g., at the mobile device), however the vehicular trip dataset can alternatively be received (e.g., from the mobile device at a remote server or remote processing endpoint; at a cloud processor), and/or can be otherwise determined. S110 can include: collecting sensor data at a mobile device S110 and detecting a vehicular trip S114.

Collecting sensor data at a mobile device S112 functions to collect data to be used to determine a vehicle trip and/or classify a vehicular transportation modality. Sensor data is preferably collected at the mobile device and/or sensors therein (e.g., movement sensors, location sensors, user-facing sensors, etc.). Data collected during S210 can include: location data (e.g., latitude/longitude, GPS, GPS accuracy, etc.), acceleration data (e.g., 6 axes, linear, rotational, etc.), velocity (e.g., integrated from inertial acceleration data), orientation (e.g., relative to gravity), data from any other suitable mobile device sensors, vehicle connection data, and/or any other suitable data. Mobile device sensor data can be collected continuously, periodically, in response to a trip detection (e.g., in accordance with Block S114), synchronously, asynchronously (e.g., between various mobile device sensors), and/or with any other suitable timing. In variants, S112 can include storing data locally at the mobile device and/or transmitting mobile device sensor data to a remote endpoint, such as a remote processing and/or data storage system (e.g., remote server, cloud processing, etc.). Data can be collected/stored in a time domain (e.g., timestamped measurements, ordered/sequential measurements) and/or frequency domain (e.g., for vibration data, such as accelerations over a collection interval/period), or can be otherwise suitably indexed/stored. Alternatively, sensor data may not be stored after features are extracted and/or may only be stored locally at the user device (e.g., during a trip, prior to trip classification, etc.).

However, sensor data can be otherwise suitably collected.

Optionally detecting a vehicle trip S114 functions to serve as a trigger for sensor data collection with one or more sensors of the mobile device, feature generation, and/or classification of the trip. A vehicle trip can be determined based on the sensor data collected in S110 and/or a subset thereof. In one variant, a vehicle trip can be detected based on a movement of the mobile device by the method described in U.S. application Ser. No. 16/201,955, filed 27 Nov. 2018, which is incorporated herein in its entirety by this reference. In an example, a vehicle trip can be determined based on a subset of the mobile device sensors (e.g., with an accelerometer; in response to satisfaction of a geofence trigger; etc.) and trigger data collection using a second subset of sensors of the mobile device.

S114 can detect a trip while the trip is ongoing (e.g., which may facilitate trip classification contemporaneously with the trip), but can additionally or alternatively detect a full duration of a trip, after completion of the trip and/or based on completion of the trip (e.g., which may facilitate trip classification based on an entire duration of the trip). Trip detection is preferably performed locally (e.g., onboard the mobile device), but can alternatively be performed remotely and/or at any other suitable endpoint(s). In a specific example, S114 can detect a trip based on coarse sensor data (e.g., low data collection frequency, based on a subset of sensors, with minimal power and/or processing bandwidth utilization, etc.) and can trigger collection of granular sensor data during a trip (e.g., which may continue for a duration of the trip, until a termination of the trip is detected, until a vehicle modality of the trip is classified, etc.).

In some variants, trip detection can inherently serve to separate legs of multi-modal vehicle trips into constituent elements, as device and/or user activity at the transition between legs of a multi-modal trip may inherently distinguish between them. For instance, the motion/activity of a user exiting a bus prior to embarking on an automobile trip may facilitate separate trip detections (and classifications) of the legs of the multi-modal trip. However, multi-modal trips can be otherwise suitably detected and classified.

In variants, detecting the vehicle trip can include: at an application of the mobile user device operating in an idle state, determining satisfaction of a geofence trigger; and in response to determining satisfaction of the geofence trigger, executing a set of hierarchical tests according to a tree-based model to detect a start of the vehicle trip. In an example, the set of hierarchical tests are based on data collected by at least one of: a motion sensor or a location sensor of the mobile user device. However, a vehicle trip can be otherwise suitably determined. Alternatively, the method can be executed independently of and/or without detection of a vehicle trip.

However, the vehicle trip dataset and/or the location dataset thereof can be otherwise suitably determined.

4.2 Feature Determination/Extraction.

Comparing the location dataset of the vehicular trip to a map S120 functions to determine (a.k.a. extract) features which can be used to classify the vehicular transport modality in accordance with Block S130. S120 can include determining features corresponding to one vehicular transportation modality based on a comparison to a map/dataset which corresponds to the transportation modality, and/or a plurality of feature sets, each corresponding to a respective transportation modality map/dataset (and based on a respective comparison). S120 can be performed locally on the mobile device, remotely (e.g., at a remote processor, cloud computing, etc.), and/or at any other suitable processing endpoints/nodes. Additionally or alternatively, in variants with multiple sets of features (generated based on multiple modality specific datasets/comparisons), these features can be extracted in any combination/permutation of series and/or parallel. For example, a first, second, and third pluralities of features can be determined via separate, parallelized cloud computing processes during S120.

The features 125 are preferably determined and/or extracted from vehicular data collected from the mobile device during S110, and more specifically location data (e.g., GPS data), but can be otherwise suitably determined. The features 125 can include: roadway features (e.g., based on a comparison to a roadmap and/or roadway data), railway features (e.g., based on a comparison to a rail map and/or rail data), bus features, (e.g., based on a comparison to a bus route map and/or bus data), public transit features (e.g., based on a comparison to a transit map and/or transit data), and/or any other suitable features. The features can characterize/score the location data relative to: a degree of statistical similarity (e.g., central tendency metrics, aggregate parameters, statistical parameters, etc.), a matching probability or likelihood, a heuristic function, and/or otherwise suitably characterize/score the vehicular (location) data relative to a map. However, the comparison module can generate any other suitable features and/or location dataset can be otherwise suitably compared to a map(s). As an example, S120 can include a first, second, and third set of features determined by comparing the location dataset of the vehicular trip to a first, second, and third map, respectively. As a second example, S120 can include: determining a set of railway features based on a railway dataset; optionally determining a set of candidate bus routes; determining a set of bus features based on a bus route dataset; determining a set of roadway features based on a roadway dataset.

In a first set of variants (examples are shown in FIG. 3 and FIG. 6), S120 can include: generating a plurality of route candidates (e.g., using a candidate route generator and a map of route segments; candidate bus routes); optionally pruning the set of route candidates; and generating features for each of the route candidates (which may serve as the inputs for classification according to S130; which can be used to generate features for bus/transit routes). In the first variant, route candidates can be generated in the format of: a set of route segments or route labels (e.g., from a pre-existing dataset; bus route identifier, train route identifier, etc.), an ordered sequence of route segments/labels, and/or otherwise suitable formatted. For example, routes and/or route segments can be matched to individual location datapoints and/or short segments of location datapoints (spanning the length of a city block, for example) based on: proximity (e.g., a predetermined distance of the location data; N closest road segments and/or transit routes to a particular location datapoint/segment, etc.), direction of motion (e.g., on the same side of the roadway), the timestamp (e.g., based on a comparison to a transit schedule), contextual information (e.g., time of day, day of week, bus route schedule, holiday calendar for a geographical location, modified bus schedule for a city/region; traffic information; accident information; direction of bus traffic on a particular road; bus-only-traffic lanes or streets; mobile device activity during the trip; etc.), feasibility evaluations (e.g., feasibility/infeasibility of reaching a particular candidate from the current path), and/or any other suitable data. The matching routes/segments candidates can then be combined to construct a candidate route as an ordered sequence of routes and/or route segments spanning the entirety of the trip (e.g., fully mapping the trip to a sequence of route segments, such as a series of buses, trains, etc.). Route candidates and/or matching routes/segments can optionally be pruned to reduce the number of combinations of route segments (and associated processing requirements) using a candidate pruner (e.g., an example is shown in FIG. 4A). In a first example, route candidates can be determined and/or refined using dynamic programming techniques. For example, route candidates can be generated and/or pruned based on trip endpoint proximity to mapped transit/bus stops, contextual information, trip/route parameters, mismatch characterization of starting/ending trails (e.g., angle of deviation, RMS distance, distance and/or time of mismatching GPS trail segment one or both ends of the trip, etc.), motion characteristics surrounding a stop (e.g., reduced speed near bus stops, acceleration/braking activity, etc.) and/or other trip/route characteristics. Features can then be extracted based on a comparison/similarity of each candidate route (e.g., pruned set of candidate routes) and the location data.

In a first example, determining a plurality of features (e.g., bus features) can include: determining a set of stop locations based on the location dataset; and comparing the stop locations to bus stops of the bus route dataset. In a second example, determining a plurality of features (e.g., bus features) can include: generating a set of candidate bus routes based on the location dataset; pruning the set of candidate bus routes based on contextual information (e.g., direction of traversal on a roadway, a bus route schedule, time of day, device activity, etc.); and determining the second plurality features based on the pruned set of candidate bus routes. In a third example, a plurality of (bus) features can include a score which is determined based on a proximity of a trip end point to a bus stop. In a fourth example, the plurality of (bus) features can include a dynamic time warping [DTW] similarity score, wherein determining the plurality of (bus) features includes: generating a candidate bus route which includes a series of route segments within the bus route dataset; and determining the DTW similarity score based on a comparison of the candidate bus route and the location dataset.

In a second set of variants (e.g., an example is shown in FIG. 5), non-exclusive with the first set, S120 can directly extract features from the location dataset using a comparison model (e.g., neural network, hidden Markov model [HMM], etc.) which is pre-trained to generate the features for a particular map. As an example, HMM map matching can directly output a similarity score (e.g., DTW similarity score), matching length fraction, and/or fraction of location data matching for an input map (associated with a particular transportation modality). In an illustrative example of the second variant, a pre-trained comparison model (e.g., HMM) can generate roadway features by comparing the location data to a first (roadway) map and can generate railway features by comparing the location data to a second (railway) map.

However, features can be otherwise suitably determined and/or the location dataset can be otherwise suitably compared to map/reference data.

4.3 Trip Classification.

Classifying a transportation modality for the vehicular trip based on the comparison S130 functions to determine a classification result (a.k.a. trip verdict) for the transportation modality of the trip. The classification result is preferably determined using a classification model (e.g., pre-trained according to S200), which can include: a binary classifier, a multi-class classifier, a neural network model (e.g., DNN, CNN, RNN, etc.), a logistic regression model, Bayesian networks (e.g., naïve Bayes model), a cascade of neural networks, compositional networks, Markov chains, decision trees, predetermined rules, probability distributions, heuristics, probabilistic graphical models, and/or other models. Classification results can include a transportation modality (e.g., a classification label selected from a predetermined set; transit trip, bus trip, railway trip, driving trip, roadway driving trip, off-road driving trip, etc.), which can optionally include a ranking or score (e.g., a classification probability). Classifications can additionally or alternatively be based on: satisfaction of a trip length condition (e.g., for an off-road classification; threshold time and/or distance, such as 30 seconds, 1 minute, 100 meters, 200 meters, etc.), satisfaction of a probability condition (e.g., for a selected classification; in order to eliminate another transportation modality from consideration; for each of a plurality of feature sets, each associated with a respective transportation modality; etc.), a joint probability (e.g., across features of a single transportation modality; between features corresponding to multiple transportation modalities; etc.), and/or any other suitable parameters/conditions. As an example, a decision parameter (e.g., a classification probability/score) associated with a railway transportation class can be based on a joint probability associated with a first plurality of (railway) features and a differential comparison feature of the associated with a roadway feature (e.g., a length fraction of the trip not matching to points on a mapped road, for example).

In a first variant (an example is shown in FIG. 3), S130 can generate the result as a binary classification probability for the transportation modality associated with the map used to generate the input features. In an example, a transit map (e.g., railway map) can be used to generate the features for a trip according to Block S120, where the features for the trip can be passed through a binary classification model (e.g., pre-trained for public transit and/or railway transportation modalities) to render a verdict for the trip (e.g., a result).

In a second variant, S130 can generate a prediction for each of a plurality of feature sets associated with the respective comparison (e.g., features; roadway features, transit features). As an example, the classification module can generate a prediction comprising a driving classification probability and a rail (or public transit) classification probability.

Predictions or classification results can optionally be subject to additional refinement, sub-classifications, or decisions by an auxiliary classification model (e.g., using predetermined rules, heuristics, a decision tree, a probabilistic graphical model, a probability distributions, a Naïve Bayes model, etc.). As an example, a driving trip can be classified as a roadway driving trip based on a mobile device speed (e.g., average speed, inferred from GPS signal frequency, etc.) exceeding a predetermined threshold (e.g., 30 mph, 40 mph, 60 mph, etc.; over a minimum distance and/or time duration). As a second example, the roadway/driving features can be passed through an auxiliary classification model which is pre-trained to generate a roadway driving classification probability and/or off-road driving classification probability, where the largest probability may be taken as the classification result and/or transportation modality for the trip.

In a first example, classifying the vehicle trip (e.g., as an off-road trip) is based on a satisfaction of a trip length condition and satisfaction of a respective probability condition for each of the first, second, and third pluralities of features. In a second example, the vehicle trip can be classified in S130 with an ML-based classification model (e.g., as an element of the classification module). In a third example, classifying the vehicle trip can include a multi-class classification using a heuristic, tree-based selection process/classifier. In a fourth example, the vehicle trip is classified as an off-road trip with a multi-class, tree-based classification model including a Bayesian network.

In some variants, the classification result for a vehicle trip can additionally be used to facilitate further sub-classification and/or refinement (e.g., to characterize user behavior/activity during the trip and/or a type of vehicle associated with a broader trip class), such as with the system(s) and/or method(s) as described in one or more of: U.S. application Ser. No. 16/022,120, filed 28 Jun. 2018, U.S. application Ser. No. 17/959,067, filed 3 Oct. 2022, and/or U.S. Provisional Application Ser. No. 63/285,251, filed 2 Dec. 2021, each of which is incorporated herein in its entirety by this reference.

Variants can facilitate classification of trips between transportation modalities which can include one or more of: driving trips, on-road trips, off-road trips, land vehicle trips, rail trips, bus trips, public transit trips, automobile trips, watercraft trips, aircraft trips, and/or any other suitable vehicle modalities or trip classes.

In some variants, trips and/or vehicle modalities associated therewith can be classified once and/or can be repeatedly/continuously updated by analyzing a (current) rolling window of sensor data (e.g., last 30 seconds, last 5 minutes, etc.). For example, the verdict for the trip modality can be repeatedly determined (e.g., in real-time/NRT) and continuously updated based on the previous and latest sensor data and/or features extracted therefrom. However, trips can additionally or alternatively be classified upon completion, or with any other suitably frequency, timing, and/or event triggers.

However, the transportation modality can be otherwise classified and/or a classification result can be otherwise suitably determined.

5. Training.

Optionally training a transportation modality classification model S200 functions to train a classification model which can be used to determine the trip result/verdict. The classification model is preferably trained using labeled training data which includes location data and a trip transportation modality label. In variants, the classification model can optionally be updated based on: remote validation/labeling of trip classifications and/or user validation of a trip classification(s) at the mobile device.

The classification model is preferably trained prior to execution of S100 (e.g., pre-trained for runtime execution of S100), but can additionally be re-trained and/or updated after S100 (e.g., based on the classification result of S100). The classification model can be trained and/or updated periodically, in response to receipt of a trip validation/label, and/or with any other suitable timing/update frequency. However, the classification model(s) can be otherwise not updated (e.g., never updated, a separate/replacement model can be trained, etc.), and/or trip results/verdicts may not be used to update the classification model. The classification model can be trained and/or updated based on supervised, semi-supervised, and/or unsupervised learning techniques, and/or can be otherwise suitably trained.

However, the classification model can be otherwise suitably trained and/or updated.

6. User Content and/or Actions

Optionally triggering an action based on the transportation modality S300 can function to facilitate provision of user content and/or mobile device services based on the transportation mode and/or activity of the user. In variants, content can include: collision assistance, traffic/navigational assistance, public transit arrival time estimates (e.g., for the user via the mobile device, for another user planning to use the same bus/train line, etc.), insurance assistance, vehicle-related advertising (e.g., maintenance services, private/ride-sharing transportation service advertising, etc.), and/or any other suitable content. Content can be provided via the mobile device (e.g., via a device API) or external systems (e.g., emergency service alerting, etc.). However, any other suitable content can be otherwise provided based on the result, or else may be altogether not provided to the user. Additionally, any other suitable actions can be triggered based on the result, such as, but not limited to: triggering an ambulance to travel to the location of a suspected collision, updating a risk score associated with a driver of the vehicle based on driving behavior detected during the trip, and/or any other actions. Alternatively, the transportation modality (trip verdict) can be stored locally or remotely (e.g., without triggering an action directly), and/or can be otherwise used.

In variants, S300 can additionally or alternatively include insurance policy recommendations for the user based on a determination that the user is riding and/or operating a vehicle off-road (e.g., based on a subsequent determination of a specific vehicle type or action type; boat insurance policy, etc.) and optionally based on any other information (e.g., other vehicular trip information, a risk score determined for the user, a quality of driving score determined for the user, etc.). In additional or alternative examples, the determined information can be used to determine (e.g., calculate, reference in a lookup table, etc.) a quote (e.g., price) for potential insurance policies (e.g., for different insurers), such that these quotes can be provided to the user (e.g., at an application executing on a user device) and he or she can optionally choose to select an insurer based on these quotes (e.g., comparison to find lowest cost and/or otherwise best quote/coverage).

In some variants, trip classification during a trip can facilitate timely actions and/or improvements to content provision during the trip, such as: improved navigational assistance, transportation-modality-based advertising during a trip, multi-modal navigational assistance (e.g., bus, train, and/or walking directions) and/or any other suitable advantages. Additionally, pre-classification of trips prior to an accident occurring may facilitate an improved or more timely accident detection and/or response, such as described in U.S. application Ser. No. 15/243,565, filed 22 Aug. 2016, which is incorporated herein in its entirety by this reference.

In a specific example, wherein the location dataset is received at a first time, the action is triggered in substantially real time relative to the first time (e.g., real time, NRT, within frame refresh rate, within 0.1 seconds, within 1 second, etc.).

However, any other actions can be triggered, and/or the method can be otherwise suitably implemented in absence of triggered actions.

Alternative embodiments implement the above methods and/or processing modules in non-public transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-public transitory computer readable media, or any suitable device. The computer-executable component can include a computing system and/or processing system (e.g., including one or more collocated or distributed, remote or local processors) connected to the non-public transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for classification of vehicle trip transportation modality comprising:
   automatically detecting a vehicle trip associated with vehicular transportation of the mobile user device;
   receiving a location dataset comprising location data collected with a location sensor of the mobile user device;
   contemporaneously comparing the location dataset with a plurality of predetermined datasets, comprising:
      determining a first plurality of features based on a first comparison between the location dataset and a railway dataset;
      determining a second plurality of features based on a second comparison between the location dataset and a bus route dataset, wherein determining the second plurality of features comprises:
         generating a plurality of candidate route segments based on the location dataset;
         generating a plurality of candidate bus routes based on the plurality of candidate route segments;
         pruning the set of candidate bus routes based on contextual information, wherein pruning a candidate bus route comprises eliminating the bus route from further consideration; and
         determining the second plurality features based on the pruned set of candidate bus routes, wherein the second plurality of features comprises a score; and
      determining a third plurality of features based on a third comparison between the location dataset and a roadway dataset;
   classifying the vehicle trip based on the first, second, and third pluralities of features; and
   based on the classification of the vehicle trip, triggering an action at the mobile user device.

2. The method of claim 1, wherein the location dataset is received at a first time, wherein the action is triggered in substantially real time relative to the first time.

3. The method of claim 2, wherein the first, second, and third pluralities of features are determined via separate, parallelized cloud computing processes.

4. The method of claim 1, wherein classifying the vehicle trip comprises: classifying the vehicle trip as an off-road trip based on a satisfaction of a trip length condition and satisfaction of a respective probability condition for each of the first, second, and third pluralities of features.

5. The method of claim 1, wherein the vehicle trip is classified with a machine-learning-based classification model.

6. The method of claim 1, wherein classifying the vehicle trip comprises a multi-class classification using a heuristic, tree-based selection process.

7. The method of claim 6, wherein classifying the vehicle trip comprises determining a decision parameter associated with a railway transportation class based on a joint probability associated with the first plurality of features and a differential comparison feature of the third plurality of features.

8. The method of claim 1, wherein determining a second plurality of features comprises:
   determining a set of stop locations based on the location dataset; and
   comparing the stop locations to bus stops of the bus route dataset.

9. The method of claim 8, wherein the score is determined based on a proximity of a trip end point to a bus stop.

10. The method of claim 1, wherein the contextual information comprises: a direction of traversal on a roadway; and a route schedule.

11. The method of claim 1, wherein the score comprises a dynamic time warping [DTW] similarity score, wherein determining the second plurality of features comprises: generating a candidate bus route comprising a series of route segments within the bus route dataset; and determining the DTW similarity score for the candidate bus route and the location dataset.

12. A method for classification of vehicle trip transportation modality comprising:
   receiving a trip dataset for a vehicle trip associated with vehicular transportation of a mobile user device, the trip dataset comprising location data collected with a location sensor of the mobile user device;

determining a first set of features by comparing the trip dataset to a transit dataset, wherein determining the first set of features comprises determining a candidate bus route comprising a series of route segments using a bus route dataset, wherein determining the candidate bus route comprises:

generating a set of candidate route segments based on the trip dataset;

generating a set of candidate bus routes based on the set of candidate route segments;

selecting a candidate bus route from the set of candidate bus routes based on contextual information;

determining a second set of features by comparing the trip dataset to a roadway driving dataset;

based on the first and second sets of features, classifying the vehicle trip as an off- road vehicle trip; and based on the classification of the vehicle trip as an off-road trip, triggering an action at the mobile user device.

13. The method of claim 12, wherein classifying the vehicle trip as an off- road trip is further based on satisfaction of a minimum trip length associated with the trip dataset.

14. The method of claim 12, wherein the first and second sets of features are each determined with a pretrained Hidden Markov Model (HMM).

15. The method of claim 12, wherein the vehicle trip is classified as an off-road trip with a multi-class, tree-based classification model comprising a Bayesian network.

16. The method of claim 12, wherein determining the first set of features comprises: determining a dynamic time warping [DTW] similarity score for the candidate bus route and the trip dataset, wherein the first set of features comprises the dynamic time warping [DTW] similarity score.

17. The method of claim 12, wherein the vehicle trip is classified as an off-road vehicle trip by a heuristic, tree-based classification process.

18. The method of claim 17, wherein classifying the vehicle trip as an off-road vehicle trip comprises determining a decision parameter associated with a railway transportation class based on a joint probability associated with the first set of features and a differential comparison feature of the second set of features.

* * * * *